United States Patent [19]
Wallace et al.

[11] Patent Number: 6,061,945
[45] Date of Patent: *May 16, 2000

[54] OPTICAL CLAMPING SYSTEM

[75] Inventors: Robert E. Wallace; Kenneth W. Sauter, both of Garland, Tex.

[73] Assignee: Litton Systems, Inc., Woodland Hills, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/019,136

[22] Filed: Feb. 5, 1998

Related U.S. Application Data

[62] Division of application No. 08/741,289, Oct. 30, 1996.

[51] Int. Cl.[7] .................................. F41G 1/38; F41G 1/40
[52] U.S. Cl. ................................................ 42/101; 33/246
[58] Field of Search ............................ 42/101; 33/245, 33/246, 247, 248, 249, 250, 292; 359/421, 422, 431

[56] References Cited

U.S. PATENT DOCUMENTS

| | | | |
|---|---|---|---|
| 960,813 | 6/1910 | Burton | 33/245 |
| 1,613,807 | 1/1927 | Rutherford et al. | 33/248 |
| 2,500,405 | 3/1950 | Fairbank | 33/297 |
| 2,715,275 | 8/1955 | Kipp | 33/248 |
| 3,476,349 | 11/1969 | Smith | 33/248 |
| 3,645,602 | 2/1972 | Clave et al. | 350/36 |
| 3,871,750 | 3/1975 | Mecklenborg | 350/286 |
| 3,879,105 | 4/1975 | Broche et al. | 350/51 |
| 3,972,584 | 8/1976 | Lobb | 350/48 |
| 4,046,461 | 9/1977 | Cherry | 350/287 |
| 4,059,343 | 11/1977 | Kowalski et al. | 350/182 |
| 4,097,818 | 6/1978 | Manoukian et al. | 331/94.5 |
| 4,290,219 | 9/1981 | Boller et al. | 42/101 |
| 4,348,108 | 9/1982 | Shindow | 356/125 |
| 4,397,107 | 8/1983 | Holden | 33/248 |
| 4,580,879 | 4/1986 | Wilson | 350/421 |
| 4,597,634 | 7/1986 | Steenblik | 350/144 |
| 5,084,780 | 1/1992 | Phillips | 359/350 |
| 5,140,151 | 8/1992 | Weiner et al. | 250/213 |
| 5,202,792 | 4/1993 | Rollin | 359/356 |
| 5,227,910 | 7/1993 | Khattak | 359/211 |
| 5,272,514 | 12/1993 | Dor | 356/251 |
| 5,283,427 | 2/1994 | Phillips et al. | 250/214 |
| 5,339,720 | 8/1994 | Pellarin et al. | 89/41.19 |
| 5,434,704 | 7/1995 | Connors et al. | 359/403 |
| 5,497,266 | 3/1996 | Owen | 359/353 |
| 5,610,771 | 3/1997 | Sigler | 359/832 |
| 5,619,378 | 4/1997 | Schwab | 359/638 |

FOREIGN PATENT DOCUMENTS

| | | | |
|---|---|---|---|
| 998212 | 7/1965 | United Kingdom | 33/246 |
| 2 143 397 | 2/1986 | United Kingdom . | |

OTHER PUBLICATIONS

Singapore Search Report, Mar. 25, 1999.
Jenkins & White; Fundamentals of Optics; 1957; coversheet and pp. 20–23.

*Primary Examiner*—Stephen M. Johnson
*Attorney, Agent, or Firm*—Baker & Botts, L.L.P.

[57] ABSTRACT

The invention comprises an alignment element for a multiple channel sight and method. In accordance with one embodiment of the invention, an alignment element (456) may comprise a first prism (492) and a second prism (494). The second prism (494) may be disposed proximate to the first prism (492). An adjustment device (506) may rotate the first prism (492) with respect to the second prism (494) to deviate an image of a first channel (54, 56) at an image plane (300).

5 Claims, 10 Drawing Sheets

OPTICAL CLAMPING SYSTEM

RELATED APPLICATIONS

This application is a divisional of application Ser. No. 08/741,289, filed Oct. 30, 1996 by Robert E. Wallace and Kenneth W. Sauter, pending.

This application is related to copending U.S. patent application Ser. No. 08/741,614, filed Oct. 31, 1996, entitled "RETICLE ASSEMBLY FOR OPTICAL SIGHT" (Attorney's Docket 021953.0232); copending U.S. patent application Ser. No. 08/741,883, filed Oct. 31, 1996, entitled "CHANNEL SELECTOR FOR MULTIPLE CHANNEL SIGHT" (Attorney's Docket 021953.0233); copending U.S. patent application Ser. No. 08/741,544, filed Oct. 31, 1996, entitled "PROTECTIVE WINDOW FOR OPTICAL SIGHT" (Attorney's Docket 021953.0234); copending U.S. patent application Ser. No. 08/741,481, filed Oct. 30, 1996, entitled "MOUNTING ASSEMBLY FOR OPTICAL SIGHT" (Attorney's Docket 021953.0235); copending U.S. patent application Ser. No. 08/741,920, filed Oct. 31, 1996, entitled "MOUNTING ASSEMBLY FOR IMAGE INTENSIFIER TUBE IN OPTICAL SIGHT" (Attorney's Docket 021953.0236).

TECHNICAL FIELD OF THE INVENTION

The present invention relates generally to multiple channel sights, and more particularly to an alignment element for a multiple channel sight and method.

BACKGROUND OF THE INVENTION

Day/night sights would typically be used by military and law enforcement personnel to aim weapons used in both day time and night time conditions. Typically, a day/night sight includes an objective lens, a reticle and an eyepiece in series with parallel day and night channels. A channel selector may be used to alternatively direct an image of a target into the day or night channel.

In a day/night sight, the objective lens and the eyepiece may be telescopic to provide a magnified image of the target. The day channel generally uses ambient light to generate an image of the target. The image may be projected to the reticle during day time use to be viewed by the user. The night channel generally includes an image intensifier to generate an illuminated image of the target. The illuminated image may be transmitted to the reticle during night time use to be viewed by the user. The reticle may include markings for aiming the weapon.

Day/night sights suffer from numerous disadvantages, mainly attributable to problems aligning image beams from the separate day and night channels. Often, image beams from the day and night channels are projected onto different locations of the reticle. For example, the image beam of the day channel may be projected above and to the left of a reticle center while the image beam of the night channel may be projected below and to the right of the reticle center. Consequently, the reticle cannot be positioned to where it is centered, and thus accurate, for both channels.

SUMMARY OF THE INVENTION

Accordingly, a need has arisen in the art for an improved multiple channel sight. The present invention provides an alignment element that substantially eliminates or reduces the disadvantages and problems associated with prior multiple channel sights.

In accordance with the present invention, an alignment element for a multiple channel sight may include a first prism and a second prism. The second prism may be disposed proximate to the first prism. An adjustment device may rotate the first prism with respect to the second prism to deviate an image of a first channel at an image plane. In one embodiment, the image plane may be a reticle.

Important technical advantages of the present invention include providing an improved multiple channel sight. In particular, images from the channels may be aligned at a reticle. Accordingly, the sight may be switched between channels without need of realigning the reticle.

Still another important technical advantage of the present invention includes providing an alignment element to deviate an image of a first channel into alignment with an image of a second channel at the reticle. In particular, the alignment element may include a first and second prism of the same deviation. The prisms may be rotated independently of one another to deviate the image in any direction at the reticle.

Other technical advantages will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
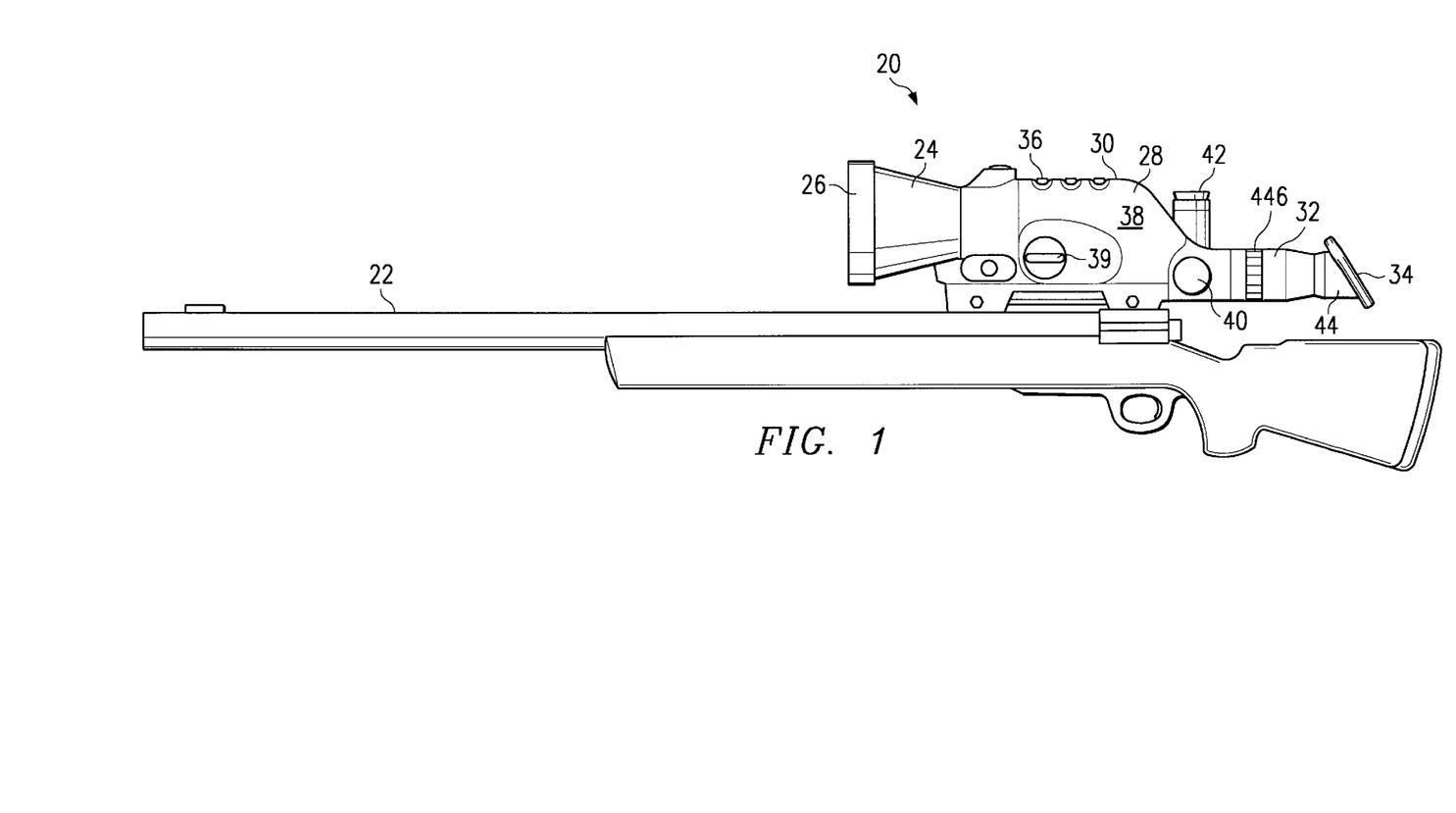
FIG. 1 is a side view of a telescopic day/night sight mounted to a weapon in accordance with one embodiment of the present invention.

The preferred embodiments of the present invention and its advantages are best understood by referring now in more detail to FIGS. 1–16 of the drawings, in which like numerals refer to like parts throughout the several views. FIG. 1 shows a perspective view of a multiple channel sight 20 for aiming a weapon 22. The multiple channel sight 20 may be used by persons such as law enforcement and military personnel to aim the weapon 22 in disparate conditions. The weapon 22 may be a rifle or any other type of weapon system that fires an aimed projectile or aimed beam such as a laser. The multiple channel sight 20 may also be used for surveillance when not mounted on the weapon 22.

In one embodiment, the multiple channel sight 20 may be a day/night sight that can be operated in day and night conditions. As shown by FIG. 1, the day/night sight 20 may include an objective lens assembly 24 at a forward end 26, a body section 28 covered by a housing 30 and an eye piece 32 at a rearward end 34. As used herein, the term "forward" designates a direction toward an object to be observed and the term "rearward" designates a direction toward a user of the day/night sight 20.

Controls 36 for operating the day/night sight 20 may be disposed on an exterior 38 of the housing 30. Preferably, the controls 36 are located at the top of the housing 30 so that they may be reached and manipulated with either hand of the user. Individual controls may have unique identifying embossments that allow the user to readily distinguish between the controls 36 in the dark by feel.

A channel selector switch 39 may also be disposed on the exterior 38 of the housing 30. As described in detail below, the channel selector switch 39 may operate a channel selector to direct an image of a scene through one of the channels of the sight 20.

An azimuth adjusting screw 40 and an elevation adjusting screw 42 for bore sighting corrections may also be provided on the exterior 38 of the housing 30. The azimuth adjusting screw 40 allows bore sighting to be adjusted for wind speed and direction. The elevation adjusting screw 42 allows bore sighting to be adjusted for gravitational effects.

A protective eye guard 44 may be provided at the rearward end 34 of the sight 20. The protective eye guard 44 may be shaped to fit around the user's eye to prevent ambient light from interfering with the user's view of the image generated by the sight. The protective eye guard 44 also prevents light generated by the sight 20 from being visible outside the sight 20.

Figure 2:
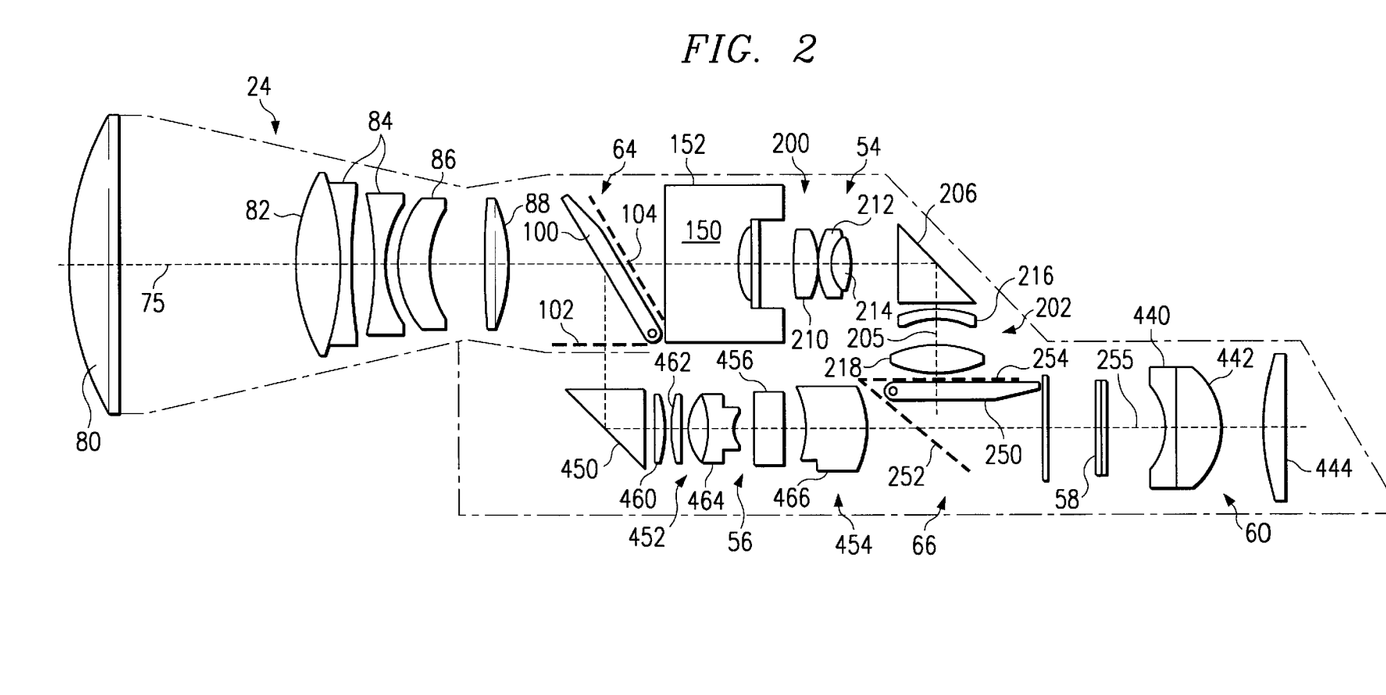
FIG. 2 is a schematic drawing of the optical components of the sight of FIG. 1.

FIG. 2 illustrates optical components for one embodiment of the day/night sight 20. The objective lens assembly 24 may collect an image of a scene. The image collected by the objective lens assembly 24 may be directed into a night channel 54 or a day channel 56. As described in detail below, the night channel 54 may electronically intensify the image of the scene. The intensified image may be projected onto a common reticle assembly 58. There, the image may be viewed by the user through an eyepiece 60. As also described in detail below, the day channel 56 may relay the image of the scene onto the reticle assembly 58. There, the user may view the image through the eyepiece 60.

The day/night sight 20 may include a channel selector to alternatively direct the image of the scene into the night channel 54 or the day channel 56. In one embodiment, the channel selector may include a first mirror assembly 64 and a second mirror assembly 66. In this example, the first mirror assembly 64 may be disposed between the objective lens assembly 24 and entrances of the night and day channels. The second mirror assembly 66 may be disposed between exits of the night and day channels and the reticle assembly 58.

An optical bench (not shown in FIG. 2) may be provided for mounting the optical components in the sight 20. The optical bench may be one or more frames or other internal structures to which components may by mounted. The optical bench may include predefined pathways, recesses, and openings for securing the optical components in a proper spatial relation. It will be understood that the design of the optical bench will vary with the configuration and the optical components of the sight 20.

In FIG. 2, the night channel 54 is located above the day channel 56 when the sight 20 is in an upright position. It should be understood that the sight 20 may be configured with the day channel 56 positioned above the night channel 54. Additionally, the day channel 56 may be positioned along side the night channel 54.

The objective lens assembly 24 of the sight 20 may be a variable zoom assembly or a single field of view assembly. For a variable zoom embodiment, the objective lens assembly 24 may include a plurality of lenses positioned along an optical axis 75. In accordance with conventional practice, the radius of curvature of a lens will be defined as positive if the center of curvature lies rearward of the lens and will be defined as negative if the center of curvature lies forward of the lens along the optical axis. A lens will be defined as converging if the lens focusing power causes parallel light rays to converge and will be defined as diverging if the lens focusing power causes parallel light rays to appear to originate from a virtual focus.

For the embodiment of FIG. 2, the objective lens assembly 24 may include an objective lens 80 followed by a positive converging lens 82, a pair of negative diverging lenses 84, a positive diverging lens 86 and a focusing lens 88. It should be understood that additional or disparate lenses may be used within the sight 20 in accordance with the present invention.

From the objective lens assembly 24, the image of the scene passes along the optical axis 75 to the first mirror assembly 64. As described in more detail below, the first mirror assembly 64 may include a swingable or flip-flop mirror 100 rotatable between a night position 102 and a day position 104. In the night position 102, the mirror 100 does not intercept the optical axis 75. Accordingly, the image of the scene passes through the first mirror assembly 64 into the night channel 54.

In the day position 104, the mirror 100 intercepts the optical axis 75 to deflect the image of the scene into the day channel 56. In one embodiment, the entrance of the day channel 56 is normal to the optical axis 75. In this embodiment, the mirror 100 may intercept the optical axis 75 at a forty-five (45) degree angle to direct the image into the entrance of the day channel 56.

Figure 3:
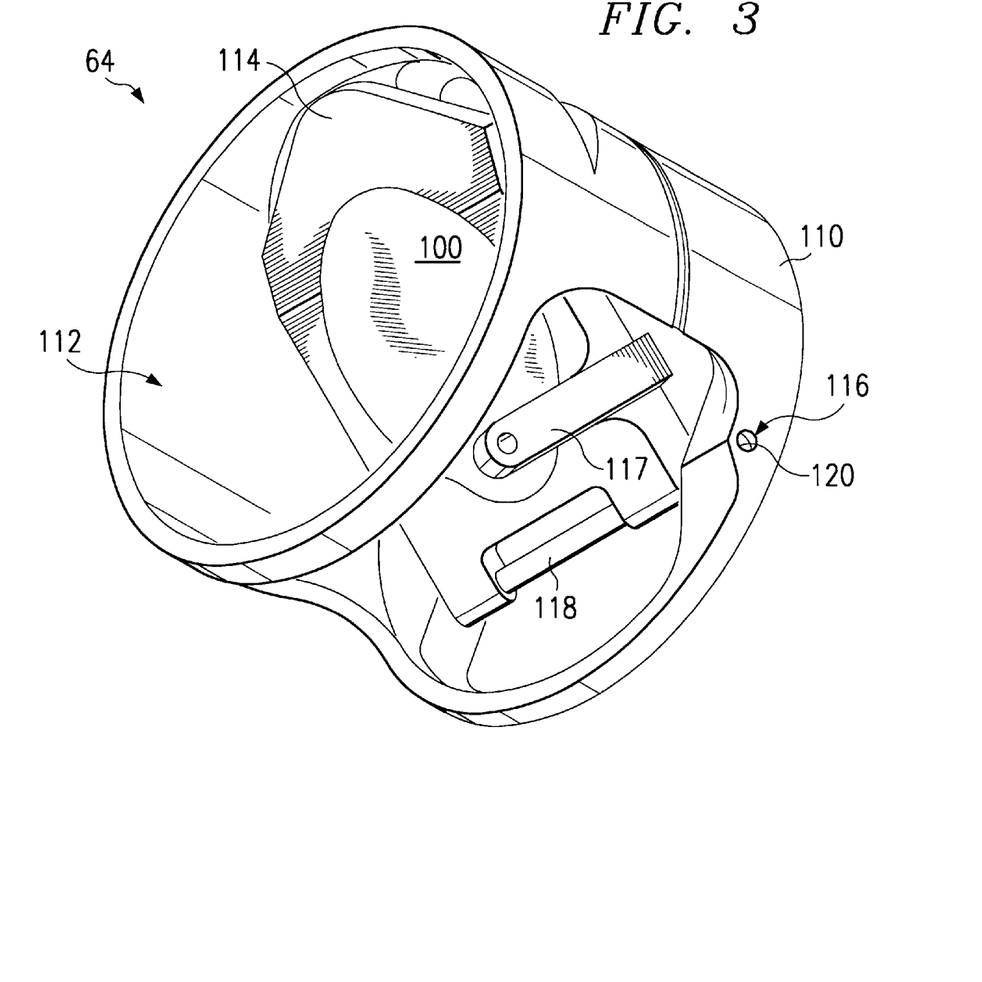
FIG. 3 is a perspective view of a mirror assembly for selectively directing light into the day or night channel of the sight of FIG. 1.
Figure 4:
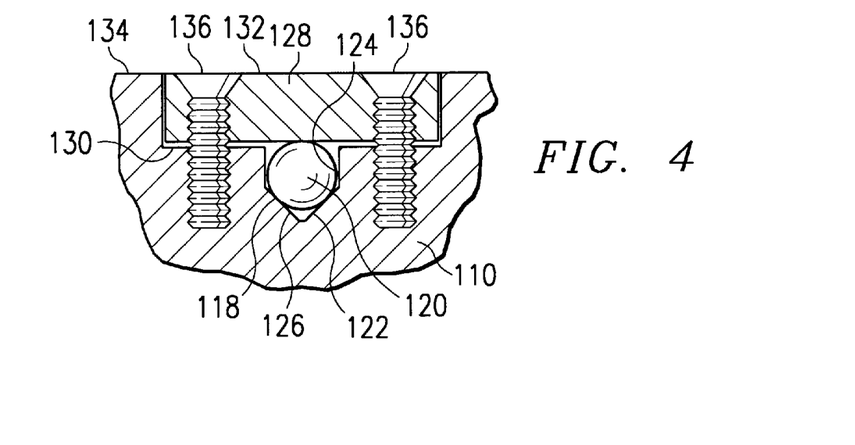
FIG. 4 is a cross sectional view of the mirror pivot assembly of FIG. 3.

FIGS. 3–4 illustrate one embodiment of the first mirror assembly 64. As shown by FIG. 3, the first mirror assembly 64 may comprise an annular frame 110 having a central aperture 112. The frame 110 may be secured to the optical bench (not shown in FIG. 3) with the central aperture 112 disposed along the optical axis 75. The central aperture 112 allows the image of the scene to pass through the frame 110 when the mirror 100 is in the night position 102 (FIG. 2).

A support 114 for mounting the mirror 100 may be rotatably coupled to the frame 110 in the central aperture 112. The support 114 may rotate about an axis 116 normal to the optical axis 75. The mirror 100 may be mounted to the support 114 for rotation about the axis 116. Accordingly, the mirror 100 may swing or flip-flop between the night position 102 (FIG. 2) and the day position 104 (FIG. 2).

An arm 117 may be coupled to the support 114 for rotating the first mirror assembly 64 between the night position 102 and the day position 104. The arm 117 may be mechanically or electrically coupled to the channel selector switch 39. The channel selector switch 39 may rotate the first and second mirror assemblies 64 and 66 together to their respective night and day positions.

A pivot shaft 118 may be fixably coupled to the support 114 to provide the axis 116 of rotation. The pivot shaft 118 may be a thin metal rod. The pivot shaft 118 may include opposed ends 120 extending from the support 114 for connection with the frame 110.

As show by FIG. 4, the frame 110 may include a trough 122 to receive each of the opposed ends 120. The troughs 122 may extend in alignment with one another on opposite sides of the aperture 112. In one embodiment, the troughs 122 may be formed in the frame 110. In this embodiment, the troughs 122 may be formed by a router or similar tool capable of forming the troughs 122 along a straight line. The troughs 122 may have substantially parallel sidewalls 124 and a furrowed bottom 126. It will be understood that the troughs 122 may be of other shapes and configurations capable of receiving the opposed ends 120.

Each end 120 of the pivot shaft 118 may be disposed in one of the troughs 122. A plate 128 may be coupled to the frame 110 across each trough 122 to secure the ends 120 of the pivot shaft 118 in the troughs 122. The frame 110 may include a cavity 130 across each trough 122 to receive the plates 128. The cavities 130 may be sized to receive the plates 128 such that a top 132 of the plates 128 is flush with a surface 134 of the frame 110.

In accordance with one aspect of the present invention, the plates 128 may contact the ends 120 of the pivot shaft 118 to control a shifting torque of the mirror 100 relative to the frame 110. The shifting torque is the torque necessary to shift the mirror 100 between the night position 102 and the day position 104. The desired shifting torque may be a balance between allowing the mirror 100 to smoothly move between the night and day positions and preventing the mirror 100 from accidentally moving between the night and day positions.

In one embodiment, the ends 120 of the pivot shaft 118 may extend above the troughs 122 for contact with the plates 128. It will be understood that the ends 120 of the pivot shaft 118 and the plates 128 may otherwise contact one another within the scope of the present invention. For example, a portion of the plates 128 may extend into the troughs 122 for contact with the ends 120 of the pivot shaft 118. In such an embodiment, the portion of the plates 128 extending into the troughs 122 may be a non integral insert (not shown).

The shifting torque of the mirror 100 may be controlled by regulating the friction caused by the contact between the plates 128 and the ends 120 of the pivot shaft 118. In one embodiment, the plates 128 may each be adjustably coupled to the frame 110 by a pair of screws 136. In this embodiment, friction caused by contact between the plates 128 and the ends 120 of the pivot shaft 118 may by regulated by tightening or loosing the screws 136. It will be understood that the plates 128 may be otherwise adjustably coupled to the frame 110 within the scope of the present invention.

Returning to FIG. 2, with the mirror 100 in the night position 102, the image of the scene passes from the objective lens assembly 24 through the first mirror assembly 64 into the night channel 54. In the night channel 54, the image may be received by an image intensifier tube 150 disposed along the optical axis 75. The image intensifier tube 150 may convert the image of the scene into an electron pattern. The image intensifier tube 150 may be inverting or non-inverting. The electrons may be multiplied and transmitted onto a phosphor screen. The phosphor screen may generate an intensified image corresponding to the image of the scene. The intensified image may be projected to the reticle assembly 58 where it can be viewed by the user through the eye piece 60.

In accordance with one aspect of the present invention, the image intensifier tube 150 may be mounted to the optical bench for selective rotation. Rotation of the image intensifier tube 150 rotates any offset of the intensified image generated by the image intensifier tube 150. An offset of the intensified image may be caused by an offset between the mechanical and optical axis of the image intensifier tube 150. Accordingly, the image intensifier tube 150 may be rotated until any offset of the intensified image at the reticle assembly 58 lies along a direction from which the intensified image can be adjusted to center. As described in more detail below, the offset of the intensified image may be centered along a direction of the reticle assembly 58 by adjusting the second mirror assembly 66. In one embodiment, the second mirror assembly 66 may center the offset of the intensified image along a vertical direction of the reticle assembly 58. It will be understood that the second mirror assembly 66 may be configured to instead center the intensified image along another direction of the reticle assembly 58.

Figure 5:
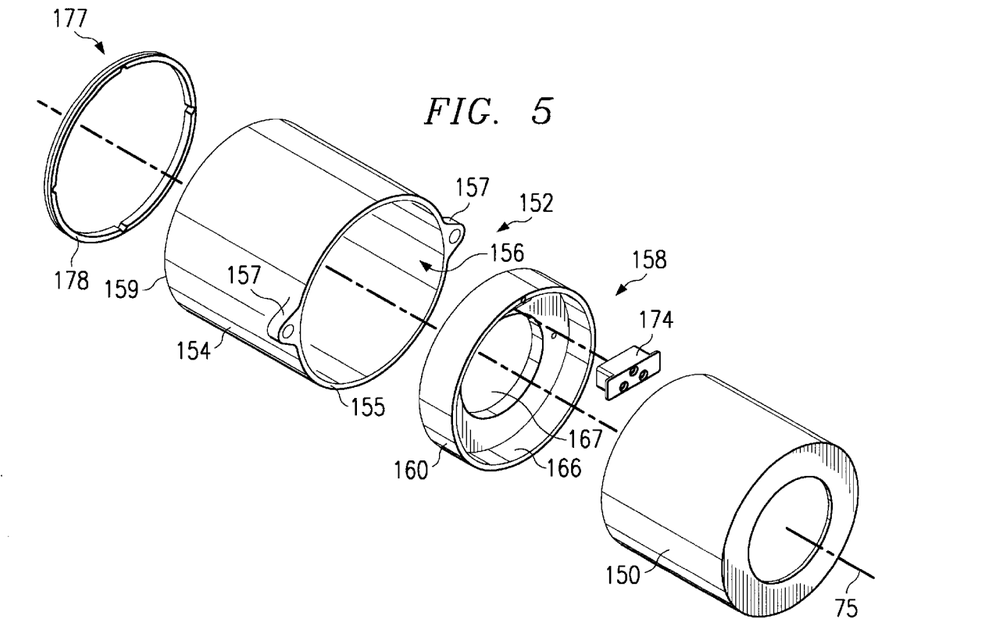
FIG. 5 is an exploded view of a mounting system for an image intensifier tube of the night channel of the sight of FIG. 1.
Figure 6:
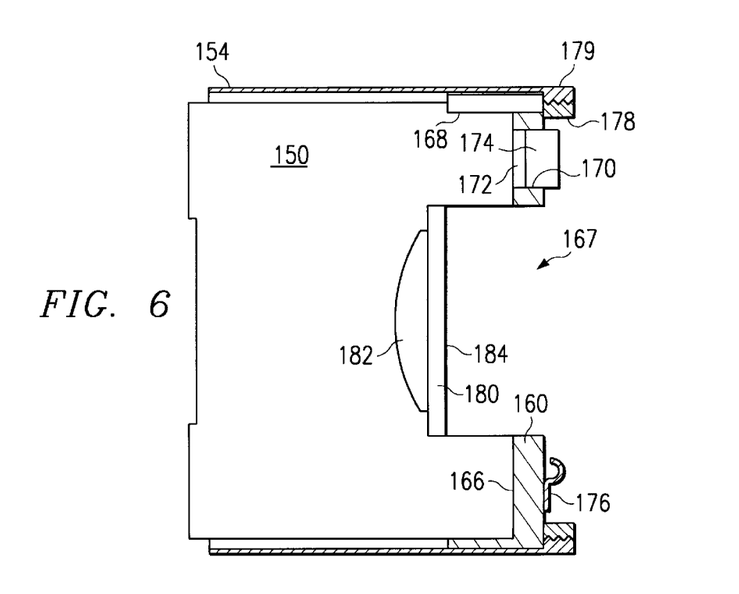
FIG. 6 is a cross sectional view of the mounting system for the image intensifier tube of FIG. 5.

FIGS. 5–6 illustrate one embodiment of a mounting assembly 152 for rotatably mounting the image intensifier tube 150 to the optical bench (not shown in FIG. 5). As shown by FIG. 5, the mounting assembly 152 may comprise an annular housing 154 having a central aperture 156 to receive the image intensifier tube 150. In one embodiment, the housing 154 may be fixably secured at a forward end 155 to the optical bench with the central aperture 156 disposed along the optical axis 75. In this embodiment, the housing 154 may be secured to the optical bench by a pair of screws (not shown) each threaded through a tab 157 of the housing 154 into the optical bench.

A retainer 158 for engaging the image intensifier tube 150 may be rotatably coupled to the housing 154. It will be understood that the housing 154 and retainer 158 may be otherwise coupled to one another and to the optical bench so long as the image intensifier tube 150 is selectably rotatable relative to the optical bench. For example, the housing 154 may be rotatably coupled to the optical bench and the retainer 158 fixably coupled to the housing 154.

In one embodiment, the retainer 158 may be rotatably coupled proximate to a rearward end 159 of the housing 154. In this embodiment, the retainer 158 may comprise a rounded slide 160. The rounded slide 160 may have a circumference slightly smaller than that of the central aperture 156 in order to fit easily, but not loosely, and to be rotatable within the central aperture 156. It will be understood that the retainer 158 may be otherwise coupled to the housing 154 within the scope of the invention.

As shown by FIG. 6, the slide 160 may include a socket 166 sized to frictionally receive the image intensifier tube 150. The socket 166 may have an aperture 167 through which the intensified image may be projected. An alignment pin 168 may extend from the socket 166 for engagement with a mating hole (not shown) of the image intensifier tube 150. The alignment pin 168 may index an opening 170 of the slide 160 with electrical contacts 172 of the image intensifier tube 150. Accordingly, the slide 160 will only engage the image intensifier tube 150 when the opening 170 is aligned with the electrical contacts 172. The alignment pin 168 may also insure that the image intensifier tube 150 rotates with the slide 160.

An insert 174 may be fitted into the opening 170 to secure the electrical contacts 172 in proper relation to one another for engagement with a plug (not shown). The plug may provide power and control for the image intensifier tube 150. The plug may be secured along a rearward side of the slide 160 by a strain relief member 176. The strain relief member 176 prevents the plug from interfering with projection of the intensified image. It will be understood that the plug may be otherwise secured within the scope of the invention.

A locking device 177 may selectively secure the image intensifier tube 150 relative to the optical bench. In one embodiment, the locking device 177 may be a locking ring 178. The locking ring 178 may have a threaded exterior adapted to engage a threaded section 179 of the housing 154. The locking ring 178 may be tightened against the slide 160 to fixably secure the image intensifier tube 150 between the slide 160 and the optical bench. Conversely, the locking ring 178 may be loosened against the slide 160 to allow the image intensifier tube 150 to be rotated between the slide 160 and the optical bench.

Accordingly, the slide 160 may be rotated about the optical axis 75 to rotate the image intensifier tube 150 until any offset of the intensified image is vertically in line with the center of the reticle assembly. The locking ring 178 may then be tightened against the slide 160 to secure the image intensifier tube 150 relative to the optical bench. As previously described, the second mirror assembly 66 may then be adjusted to vertically center the intensified image at the reticle assembly 58.

In accordance with one aspect of the present invention, a protective window 180 may be sealed to a projection end 182 of the image intensifier tube 150. The projection end 182 projects the intensified image to the reticle assembly 58. The protective window 180 may shield the projection end 182 from dirt that has settled within the sight 20. As used herein, the term "dirt" means soiling substances such as dust, oils, and the like that are capable of interfering with the user's view of the image.

As shown in FIG. 6, the protective window 180 may be sealed directly to the projecting end 182 of the image intensifier tube 150. The projecting end 182 may be a phosphorous screen. The protective window 180 may be sealed to the projecting end 182, a shoulder spaced apart from the projecting end 182, a spacer ring, or the like. The protective window 180 may be sealed with a known adhesive for optical surfaces or the like.

The protective window 180 shields the projection end 182 of the image intensifier tube 150 by collecting dirt at a plane 184 that is out of focus with the projection end 182. Accordingly, the intensified image may be viewed and magnified with little or no interference from dirt that has settled within the sight 20. The distance between the projection end 182 and the collecting plane 184 may be varied by adjusting the thickness of the protective window 180 or of a spacer ring.

From the image intensifier tube 150, the intensified image may be propagated through the night channel 54 by one or more optical components. For the embodiment shown by FIG. 2, the night channel may include a first lens set 200 disposed along the optical axis 75 and a second lens set 202 disposed along a second optical axis 205 normal to the optical axis 75. A ninety degree prism 206 may direct an image beam from the optical axis 75 to the second optical axis 205.

The first lens set 200 may include a negative converging lens 210, a positive diverging lens 212 and a positive converging lens 214. The second lens set 202 may include a positive diverging lens 216 and a positive converging lens 218. It should be understood that additional or disparate lenses may be used with the first and second lens sets 200 and 202.

In accordance with one aspect of the present invention, the lenses may be clamped in a direction perpendicular to their optical axis. Perpendicular clamping prevents the lenses from moving along the optical axis during the clamping process. Such movement along the optical axis may distort the image of the scene at the reticle assembly 58.

Figure 7:
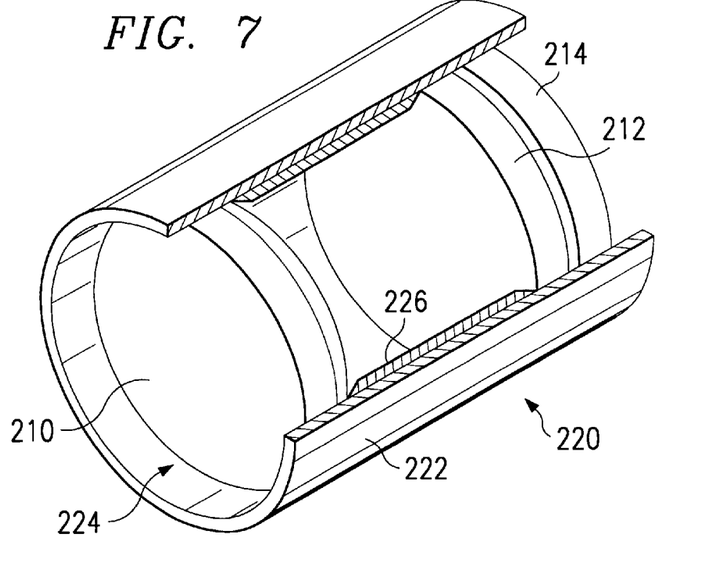
FIG. 7 is a perspective view with portions broken away of a housing for securing lenses of the sight of FIG. 1.

FIG. 7 illustrates one embodiment of a lens assembly 220 for housing lenses of the first lens set 200. As shown by FIG. 7, the lens assembly 220 may include an annular housing 222 having a central aperture 224. The central aperture 224 allows the image of the scene to pass through the housing 222 and be acted upon by the lenses. The housing 222 may be secured to the optical bench with the central aperture 224 disposed along the optical axis 75.

For the first lens set 200, a spacer 226 may be placed between the lens 210 and the lens 212 to position the lenses 210 and 212 at a desired distance from one another. Lens 214 may be positioned directly next to lens 212. The lenses 210, 212 and 214 and the spacer 226 may be secured in the housing 222 with a known adhesive or the like. It will be understood that other methods may be used to secure the lenses and spacer in the housing 220. For example, the lenses and spacer may be secured in the housing 222 by retainers, locking rings, detents and the like capable of clamping the lenses and spacer together between ends of the housing 222.

Figure 8:
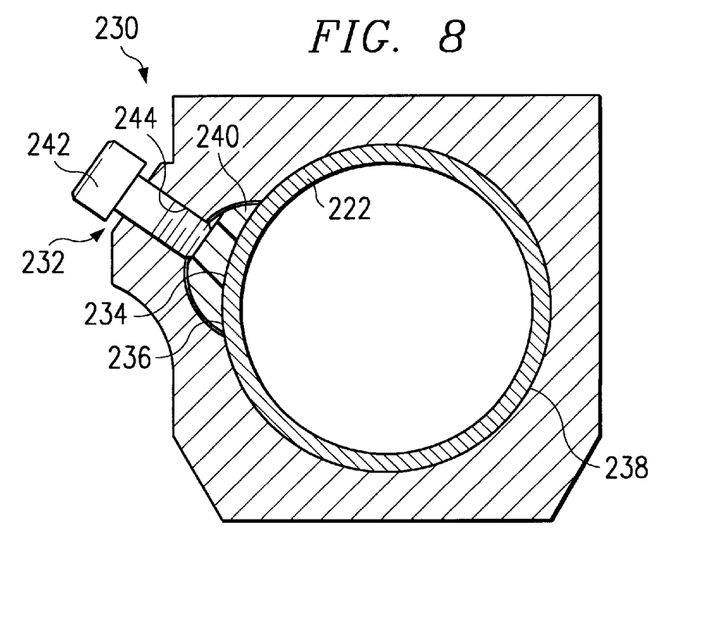
FIG. 8 is a cross sectional view of a clamping assembly for securing the lens housing of FIG. 7.

FIG. 8 illustrates one embodiment of a clamping assembly 230 for clamping the lens assembly 220 in a direction perpendicular to the optical axis 75. As shown by FIG. 8, the clamping assembly 230 may include a clamp 232 having a surface 234 adapted to engage a periphery 236 of the lens assembly 220. The clamp 232 may be tightened to secure the lens assembly 220 between the clamp 232 and a stop 238.

In one embodiment, the clamp 232 may comprise a brace 240 and a screw 242. The brace 240 may include the surface 234 adapted to engage the periphery 236 of the lens assembly 220. The periphery 236 of the lens assembly 220 may be the annular housing 222. In this case, the surface 234 may have a concave shape adapted to engage the annular housing 222.

The screw 242 may engage a threaded section 244 of the optical bench and contact the brace 240 opposite the surface 234. The stop 238 may be a section of the optical bench opposite the screw 242. The screw 240 may be adjustable in the direction of the stop 238 to secure the lens assembly 220 within the optical bench.

It will be understood that lenses 216 and 218 of the second lens set 202 may be secured in a lens assembly as described above in connection with FIG. 7. It will be further understood that the lens assembly of the second lens set 202 may be clamped in the direction perpendicular to the second optical axis 205 as described above in connection with FIG. 8.

Referring back to FIG. 2, the intensified image may pass from the night channel 54 to the second mirror assembly 66. As described in more detail below, the second mirror assembly 66 may include a swingable or flip-flop mirror 250 rotatable between a night position 252 and a day position 254. In the night position 252, the mirror 250 may intercept the second optical axis 205 of the night channel 54 to direct the intensified image to the reticle assembly 58. The reticle assembly 58 may be disposed along a third optical axis 255. In one embodiment, the third optical axis 255 may be normal to the second optical axis 205. In this embodiment, the mirror 250 may intercept the second optical axis 205 at a forty-five (45) degree angle to direct the intensified image to the third optical axis 255. In the day position 254, the mirror 250 does not intercept a third optical axis 255. Accordingly, an image of the day channel 56 may pass through the second mirror assembly 66 to the reticle assembly 58.

Figure 9:
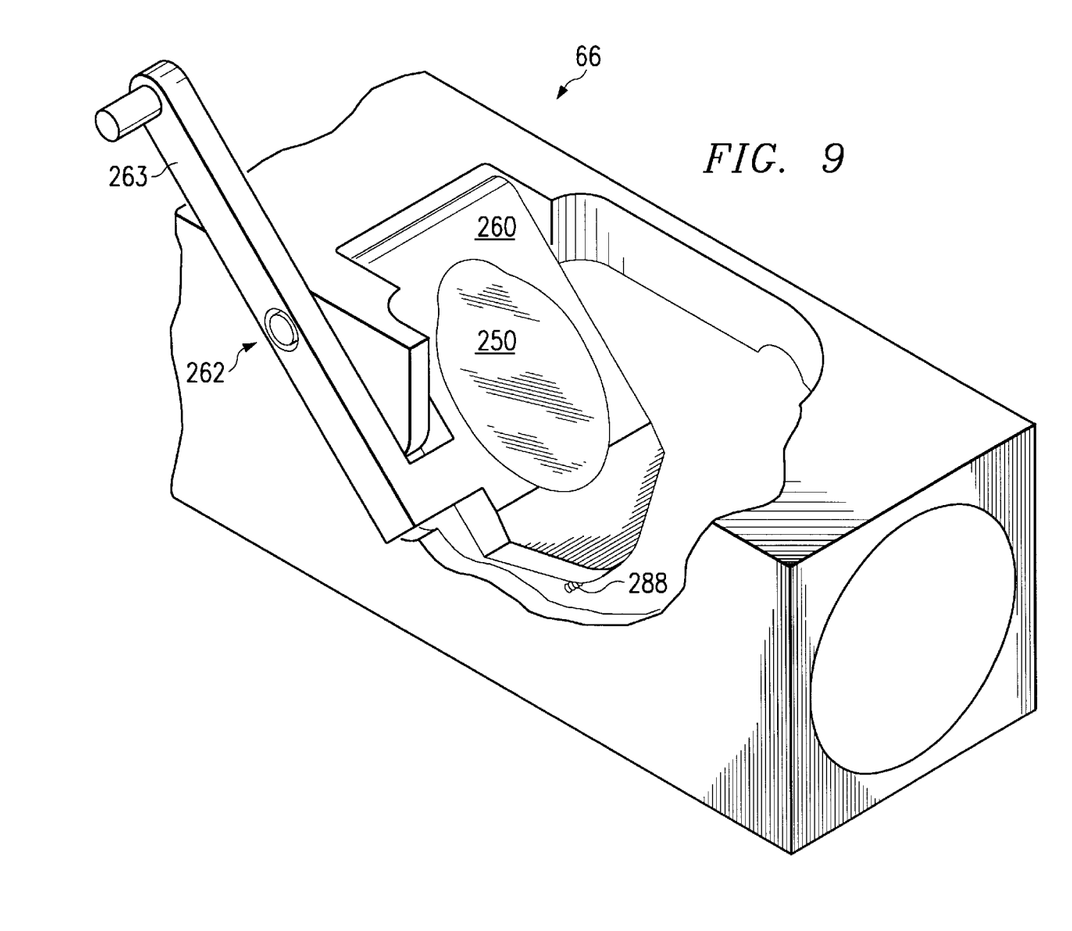
FIG. 9 is a perspective view of a mirror assembly for selectively directing the image of the day or night channel to a reticle assembly of the sight of FIG. 1.
Figure 10:
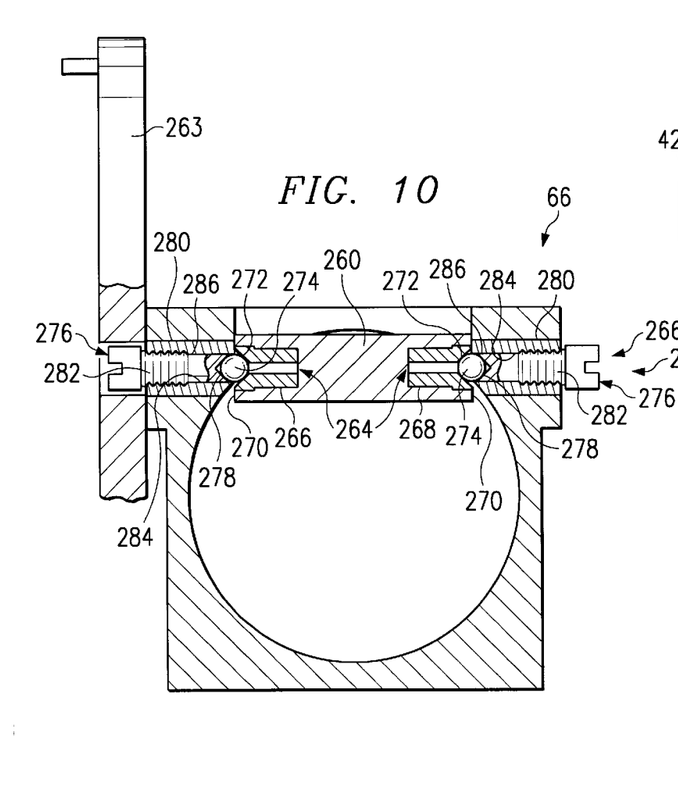
FIG. 10 is a cross sectional view of the mirror assembly of FIG. 9.

FIGS. 9–10 illustrate one embodiment of the second mirror assembly 66. As shown by FIG. 9, the second mirror assembly 66 may include a support 260 rotatably coupled to the optical bench. The support 260 may rotate about an axis 262 normal to the third optical axis 255. The mirror 250 may be mounted to the support 260 for rotation about the axis 262. Accordingly, the mirror 250 may swing or flip-flop between the night position 252 (FIG. 2) and the day position 254 (FIG. 2).

An arm 263 may be coupled to the support 260 for rotating the second mirror assembly 66 between the night position 252 and the day position 254. The arm 263 may be mechanically or electrically coupled to the channel selector switch 39. As previously described, the channel selector switch 39 may rotate the first and second mirror assemblies 64 and 66 together to their respective night and day positions.

As best shown by FIG. 10, a pivot assembly 264 may be fixably coupled to the support 260 to provide the axis of rotation 262. In one embodiment, the pivot assembly 264 may comprise a first insert 266 and a second insert 268. The first and second inserts 266 and 268 may be press fit into opposite edges 270 of the support 260. The first and second inserts 266 and 268 may have opposed recess ends 272 in alignment with one another. The outer edge of the recess ends 272 may be substantially flush with the edges 270 of the support 260.

A ball 274 may engage each of the recessed ends 272. In one embodiment, the balls 274 may be sized to sit in the recessed ends 272. In this embodiment, the recessed ends 272 may be cone-shaped. It will be understood that the recessed ends 272 may have a different shape or configuration so long as the ends are capable of engaging the balls 274.

A holder assembly 276 may engage each of the balls 274. In one embodiment, each holder assembly 276 may include a recessed end 278 to engage one of the balls 274. As with the recessed ends 272 of the inserts 266 and 268, the recessed ends 278 of the holder assemblies 276 may be cone-shaped. It will be understood that the recessed ends 278 of the holder assemblies 276 may have a different shape or configuration so long as the ends are capable of engaging the balls 274.

In accordance with one aspect of the present invention, the holder assemblies 276 may be adjustable along the axis 262 of rotation of the support to control a shifting torque of the mirror 250 relative to the optical bench. A shifting torque is a torque necessary to shift the mirror 250 between the night position 252 and the day position 254. The desired shifting torque may be a balance between allowing the mirror 250 to smoothly move between the day and night positions and preventing the mirror 250 from accidentally moving between the day and night positions.

In one embodiment, the holder assemblies 276 may each comprise a bushing 280 and an adjustment screw 282. The recessed end 278 for engaging the ball 274 may be disposed at an end of the adjustment screw 282. The bushing 280 may be mounted in the optical bench along the axis of rotation 262 of the support 260. The adjustment screw 282 may engage the bushing 280 along the axis of rotation 262.

Each of the adjustment screws 282 may be threaded to adjustably engage the bushing 280. Accordingly, the adjustment screws 282 may be tightened or loosened against the balls 274. The shifting torque of the mirror 250 may be controlled by regulating the tension on the balls 274 caused by the adjustment screws 282.

The adjustment screws 282 may each include a smooth bore section 284 press fit into smooth bore cavity 286 of the bushing 280. The press fit prevents the support 260 from shifting from the axis of rotation 262 due to play in the threads of the bushings 280 and the adjustment screws 282.

Referring back to FIG. 9, the second mirror assembly 66 may include an alignment screw 288 to control the angle at which the mirror 250 intercepts the second optical axis 205. The alignment screw 288 may contact the back of the support 260. The alignment screw 288 may raise the mirror 250 to reduce the angle at which the mirror 250 intercepts the second optical axis 205. This adjustment will vertically raise the intensified image at the reticle assembly 58. Conversely, the alignment screw 288 may lower the mirror 250 to increase the angle at which the mirror 250 intercepts the second optical axis 205. This adjustment will vertically lower the intensified image at the reticle assembly 58.

Figure 11:
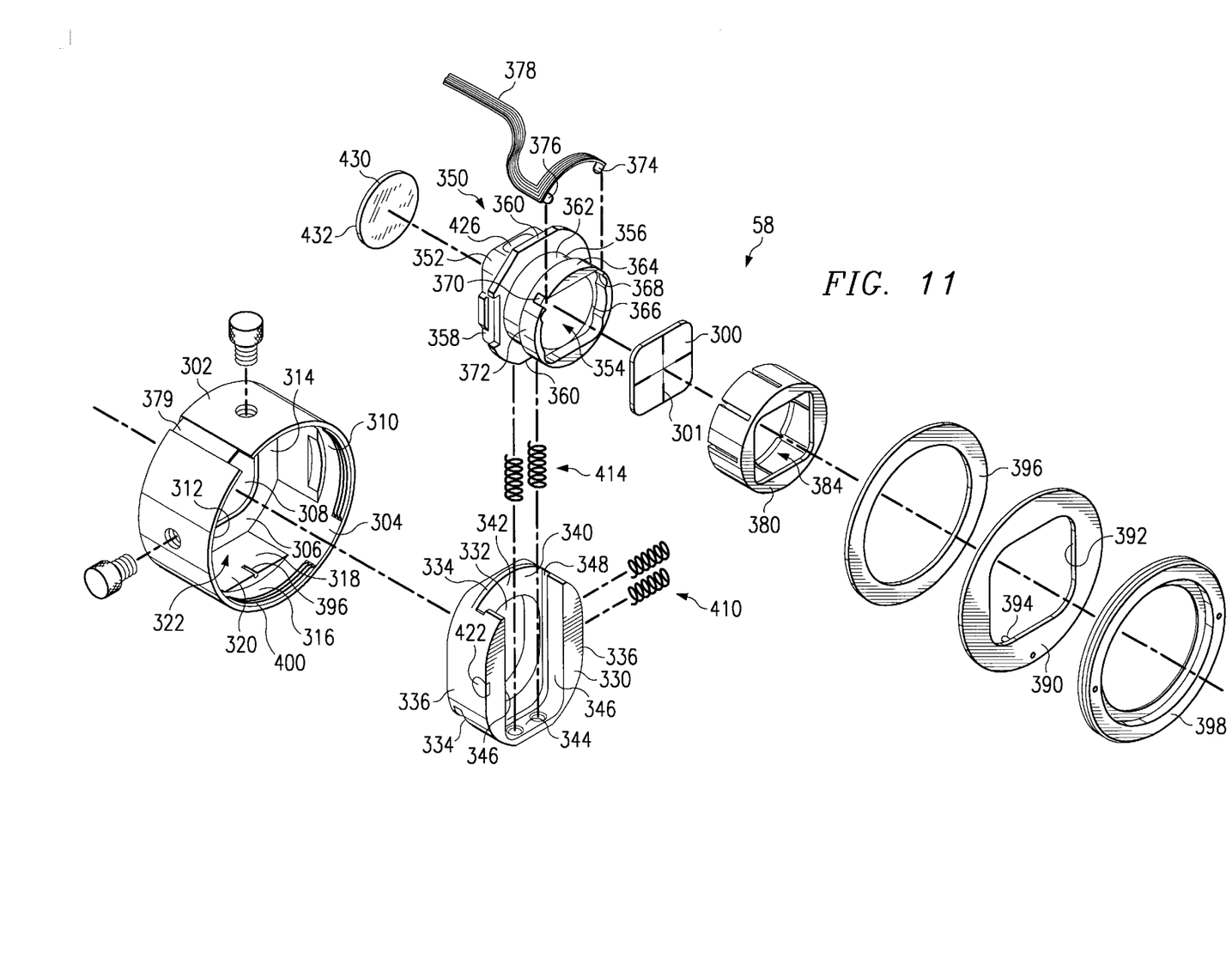
FIG. 11 is an exploded view of the reticle assembly of the sight of FIG. 1.

With the mirror 250 in the night position 252, the intensified image may be directed to the reticle assembly 58. At the reticle assembly 58, the intensified image may be projected onto a reticle 300 (FIG. 11). As described in more detail below, the reticle 300 may include a targeting pattern 301 for aligning the sight 20 with a target. The position of the targeting pattern 301 may be adjusted in the reticle assembly 58 to compensate for wind speed, wind direction, and gravitational effects. Typically, the necessary reticle adjustment increases with the distance to the target.

In accordance with one aspect of the present invention, the reticle assembly 58 may allow for increased adjustment of the reticle 300. This increase permits the user of the sight 20 to aim the weapon 22 at more distant targets. Adjustment of the reticle 300 may be increased by disposing sliding components of the reticle assembly 58 in slots with sidewalls that form the control surfaces for the sliding components. Accordingly, additional space need not be set aside in the reticle assembly 58 for installing control surfaces of the sliding components.

Figure 12:
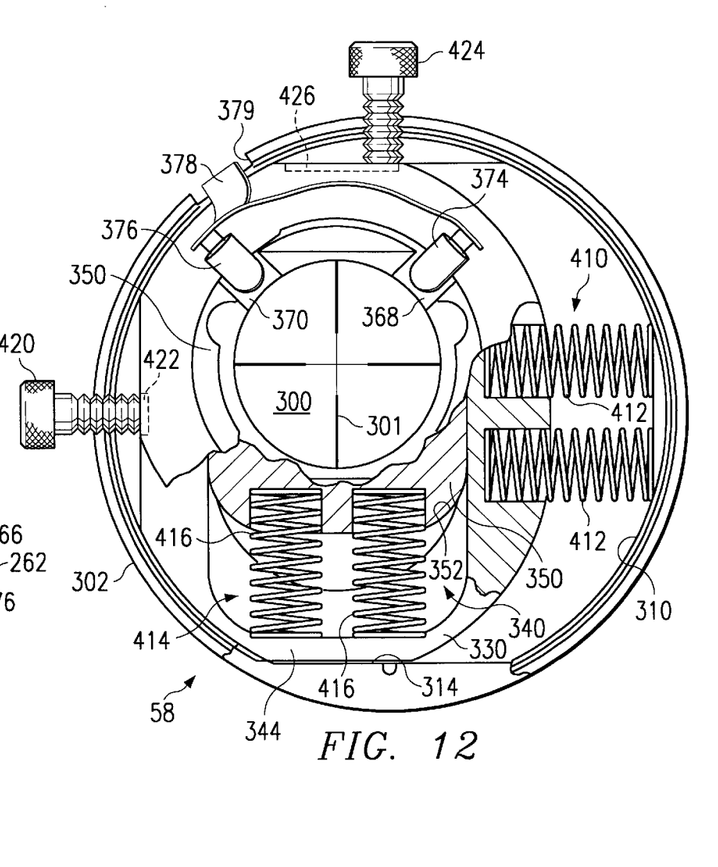
FIG. 12 is a top plan view with portions broken away of the reticle assembly of FIG. 11.

FIGS. 11–12 illustrate one embodiment of the reticle assembly 58. As shown by FIG. 11, the reticle assembly 58 may comprise a substantially annular housing 302 with a substantially round inside surface 304 and a bottom 306. The inside surface 304 may include a first side 310 and an opposed second side 312. The inside surface 304 may also include a third side 314 and opposed fourth side 316 between the first and seconds sides 310 and 312. The bottom 306 of the housing 302 may have an extended aperture 308. The extended aperture 308 may be substantially square in shape with rounded corners.

A pair of opposed side walls 318 may be formed at the bottom 306 of the housing 302 along the third and fourth sides 314 and 316. The opposed side walls 318 may form a first slot 322. A pair of ways 320 may define the opposed side walls 318. Accordingly, the first slot 322 may extend between the first side 310 and the second side 312 of the inside surface 304.

A cross slide 330 may be disposed in the first slot 322. The cross slide 330 may be substantially rectangular in shape and have an elongated aperture 332. The elongated aperture 332 may be substantially rectangular in shape with rounded corners.

The cross slide 330 may have substantially parallel edges 334 slidably engaging the ways 320 of the housing 302. The ways 320 function as control surfaces for the cross slide 330. Accordingly, the cross slide 330 may slide along the ways 320 between the first side 310 and the second side 312 of the housing 302.

The cross slide 330 may have opposed ends 336 facing the first and second sides 310 and 312 of the housing 302. The ends 336 may be rounded to substantially conform to the shape of the first and second sides 310 and 312. This allows the cross slide 330 to slide toward the first side 310 until it is substantially flush with that side and to slide toward the second side 312 until it is substantially flush with that side. Accordingly, the cross slide 330 may slide a maximum distance within the housing 302.

A second slot 340 may be formed in the cross slide 330. The second slot 340 may be substantially normal to the first slot 322. Accordingly, the second slot 340 may extend between the third side 314 and the fourth side 316 of the housing 302. The second slot 340 may have an open end 342, an opposite closed end 344 and opposed side walls 346. A pair of ways 348 may define the opposed side walls 346.

A reticle holder 350 may be disposed in the second slot 340 of the cross slide 330. The reticle holder 350 may include a base 352, a viewing aperture 354 and a projection 356 extending from the base 352 around the viewing aperture 354. The viewing aperture 354 may be substantially round in shape.

The base 352 of the reticle holder 350 may have substantially parallel edges 358 slidably engaging the ways 348 of the cross slide 330. The ways 348 function as control surfaces for the reticle holder 350. Accordingly, the reticle holder 350 may slide along the ways 348 between the third side 314 and the fourth side 316 of the housing 302.

The base 352 of the reticle holder 350 may have opposed ends 360 facing the third and fourth sides 314 and 316 of the housing 302. The ends 360 may be rounded to substantially conform to the shape of the third and fourth sides 314 and 316. This allows the reticle holder 350 to slide toward the third side 314 until it is substantially flush with that side and to slide toward the fourth side 316 until it is substantially flush with that side. Accordingly, the reticle holder 350 may slide a maximum distance within the cross slide 330.

The projection 356 may include an intermediate section 362 and an enlarged head 364. The enlarged head 364 may include a top recess 366 sized to receive the reticle 300. The reticle 300 may be substantially square in shape with rounded corners. The reticle 300 may be secured in the recess 366 with an optical adhesive or the like. It will be understood that the reticle 300 may be otherwise secured in the recess 366 within the scope of the invention.

As previously discussed, the reticle 300 may include the targeting pattern 301. The targeting pattern 301 may be cross-hairs. It will be understood that other targeting patterns may be used that are capable of aligning the sight 20 with the target.

A first notch 368 and a second notch 370 may be formed in the head 364. The notches 368 and 370 may extend from the reticle 300 to an exterior 372 of the head 364. A reticle light 374 may be disposed in the first notch 368. The reticle light 374 may illuminate the targeting pattern 301 during night time use. A status indicator 376 may be disposed in the second notch 370. In one embodiment, the status indicator 376 may activate to alert the user of a low battery status. The reticle light 374 and the status indicator 376 may be light emitting diodes (LED). Power and control for the reticle light 374 and the status indicator 376 may be provided by a flex circuit 378. The flex circuit 378 allows the reticle light 374 and the status indicator 376 to be moved with the reticle 300. The flex circuit 378 may extend from the reticle holder 350 down a groove 379 of the housing 302 of the reticle assembly 58.

An annular cover 380 may clamp over the enlarged head 364 to secure the reticle light 374 and the status indicator 376 in the first and second notches 368 and 370. The cover 380 may include an aperture 384 substantially matching the shape and size of the reticle 300. The aperture 384 allows the reticle 300 to be viewed from the eye piece 60 without interference from the cover 380.

A guide ring 390 may be disposed about the intermediate section 362 of the projection 356. The guide ring 390 may sit on the ways 320 of the first slot 322. It will be understood that the guide ring 390 may be otherwise secured in the housing 302 as long as the guide ring 390 is positioned about the intermediate section 362.

The guide ring 390 may include a guide 392 to define an area in which the reticle holder 350, and thus the reticle 300, may be adjusted. The guide 392 may be substantially square in shape with rounded corners. The corners may be rounded in conformance with a diameter of the intermediate section 362. Accordingly, the intermediate section 362 may fit substantially flush against the corners of the guide 392 to maximize movement of the intermediate section 362 in the guide 392.

The guide ring 390 may include an alignment pin 394. The alignment pin 394 may engage a mating hole 396 formed in one of the ways 320 of the first slot 322. The alignment pin 394 may index the guide 392 with the extended aperture 308 of the housing 302, the elongated aperture 332 of the cross slide 330 and the viewing aperture 354 of the reticle holder 350. Accordingly, as the reticle holder 350 is moved within the cross slide 330 and the cross slide 330 is moved within the housing 302, the viewing aperture 354 continually overlaps the elongated aperture 332 and the elongated aperture 332 continually overlaps the extended aperture 308. As a result, an image may be projected onto the reticle 300 no matter the position of the reticle 300 in the reticle assembly 58.

An intermediate washer 396 may be disposed between the guide ring 390 and the reticle holder 350. The intermediate washer 396 may reduce friction between the guide ring 390 and the reticle holder 350. In one embodiment, the intermediate washer 396 may be constructed of Teflon. It will be understood that the intermediate washer 396 may be constructed of other materials capable of reducing friction between sliding members.

A locking ring 398 may secure the guide ring 390, intermediate washer 396, reticle holder 350 and cross slide 330 in the reticle housing 302. The locking ring 398 may be threaded to engage threads 400 of the housing 302. The locking ring 398 may be tightened to a point where the reticle holder 350 and the cross slide 330 move smoothly but not loosely within the reticle housing 302.

As best shown by FIG. 12, a first spring element 410 may be disposed between an end of the cross slide 330 and the first side wall 310 of the housing 302. The first spring element 410 may comprise a pair of springs 412. The springs 412 may bias cross slide 330 away from the first side 310 of the housing 302. Similarly, a second spring element 414 may be disposed between the closed end 344 of the second slot 340 and the base 352 of the reticle holder 350. The second spring element 414 may comprise a pair of springs 416. The springs 416 may bias the reticle holder 350 away from the closed end 344 of the second slot 340 which is proximate to the third side 314 of the housing 302.

A first push rod 420 may contact the cross slide 330 opposite the springs 412. The first push rod 420 may contact a strike plate 422 disposed in the cross slide 330. The strike plate 422 may prevent wear and tear on the cross slide 330 by an end of the first push rod 420.

The first push rod 420 may be adjustable relative to the housing 302. The first push rod 420 may position the cross slide 330 at a desired position in the first slot 322 by overcoming the bias of the springs 412. The combination of the first push rod 420 and the springs 412 may allow the cross slide 330 to be easily adjusted within the first slot 322 and may also retain the cross slide 330 at its desired position in the first slot 322. The first push rod 420 may be coupled to the azimuth adjusting screw 40 provided on the exterior 38 of the sight housing 30.

A second push rod 424 may contact the reticle holder 350 opposite the springs 416. The second push rod 424 may contact an elongated strike plate 426 disposed in the base 352 of the reticle holder 350. The elongated strike plate 426 may prevent wear and tear on the base 352 of the reticle holder 350 by an end of the second push rod 424.

The second push rod 424 may be adjustable relative to the housing 302. The second push rod 424 may position the reticle holder 350 to a desired position in the second slot 340 by overcoming the bias of the springs 416. The combination of the second push rod 424 and the springs 416 may allow the reticle holder 350 to be easily adjusted within the second slot 340 and may also retain the reticle holder 350 at its desired position in the second slot 340. The second push rod 424 may be coupled to the elevation adjusting screw 42 provided on the exterior 38 of the housing 30.

Returning to FIG. 11, a protective window 430 may be sealed to the reticle 300 in accordance with one aspect of the present invention. The protective window 430 may shield the reticle 300 from dirt that has settled within the sight 20. As previously described, the term "dirt" means soiling substances such as dust, oils and the like that are capable of interfering with the user's view of the image at the reticle 300.

The protective window 430 may disposed in the viewing aperture 354 of the reticle holder 350. The protective window 430 may be sealed in the viewing aperture 354 with a known adhesive for optical surfaces or the like.

The protective window 430 shields a reticle 300 by collecting dirt at a plane 432 that is out of focus with the eye piece's 60 view of the reticle 300. Accordingly, the reticle 300 may be viewed and magnified with little or no interference from dirt that has settled within the sight 20. The distance between the reticle 300 and the collecting plane 432 may be varied by adjusting the position of the protective window 430 in the viewing aperture 354 of the reticle holder 350.

As previously described, the image projected onto the reticle 300 may be viewed by the user through the eye piece 60. For the embodiment shown by FIG. 2, the eye piece 60 may magnify the image of the reticle 300. In this embodiment, the eye piece 60 may comprise a negative diverging lens 440, a positive diverging lens 442 and a positive converging lens 444. The lenses may be adjusted relative to one another by a zoom ring 446 mounted on an exterior of the eye piece 60. It will be understood that additional or disparate lenses may be used for the eye piece 60.

Returning now to the first mirror assembly 64, when the mirror 100 is in the day position 104, the image of the scene may be directed into the day channel 56. In the embodiment shown by FIG. 2, the day channel 56 may include a 90 degree prism 450 to direct the image beam to the third optical axis 255. A first lens set 452 and a second lens set 454 may be disposed in the day channel 56 along the third optical axis 255. An alignment element 456 may be disposed along the third optical axis 255 between the first lens set 452 and the second lens set 454.

The first lens set 452 may include a negative converging lens 460, a positive diverging lens 462 and a collimating lens 464. The second lens set 454 may include a collimating lens 466. The collimating lenses 462 and 466 may collimate the image beam as it travels through the alignment element 456.

The lenses of the first and second lens sets 452 and 454 may be secured in a lens assembly as described above in connection with FIG. 7. The lens assemblies for the first and second lens sets 452 and 454 may be clamped in a direction perpendicular to the third optical axis 255 as described above in connection with FIG. 8.

In accordance with one aspect of the present invention, the alignment element 456 may deviate the image of the day channel 56 into alignment with the intensified image of the night channel 54 at the reticle 300. The alignment element 456 may be a Risley prism. Accordingly, the user may switch the sight 20 between the night channel 54 and the day channel 56 without need of realigning the reticle 300. It will be understood that the alignment element 456 may be used instead in the night channel 54 to deviate the intensified image into alignment with the image of the day channel 56 at the reticle 300.

Figure 13:
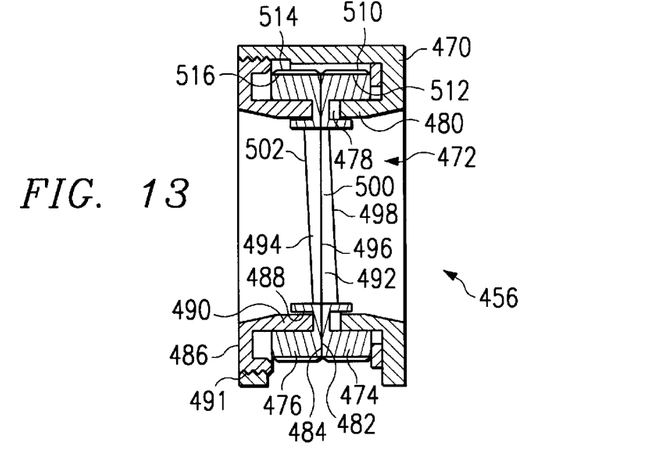
FIG. 13 is a top plan view of an alignment element of the sight of FIG. 1.

As shown by FIG. 13, the alignment element 456 may comprise a housing 470 having a central aperture 472. A first annular frame 474 and a second annular frame 476 may be disposed in the central aperture 472 of the alignment element 456. The first annular frame 474 and the second annular frame 476 may rotate independently of one another and of the housing 470.

In one embodiment, the first annular frame 474 may include a circular recess 478 along an outside surface for receiving a circular lip 480 of the housing 470. The first annular frame 474 may rotate about the circular lip 480 of the housing 470. An inside surface 482 of the first annular frame 474 may abut an inside surface 484 of the second annular frame 476. The second annular frame 476 may be secured in the housing 470 by a retainer 486. The outside surface of the second annular frame 476 may include a circular recess 488 for receiving a lip 490 of the retainer 486. The second annular frame 476 may rotate about the circular lip 490 of the retainer 486. The retainer 486 may be threaded to engage a threaded section 491 of the housing 470.

The first annular frame 474 may include a first prism 492. The second annular frame 476 may include the second prism 494. In one embodiment, the first prism 492 may have a flat back 496 and an angled face 498. The second prism 494 may have a flat back 500 and an angled face 502. Preferably, the flat backs 496 and 500 of the first and second prisms 492 and 494 face one another. Accordingly, the prisms 492 and 494 may rotate in substantially parallel planes. This may allow the first and second prisms 492 and 494 to be placed in closely together without interfering with one another during rotation.

Figure 14:
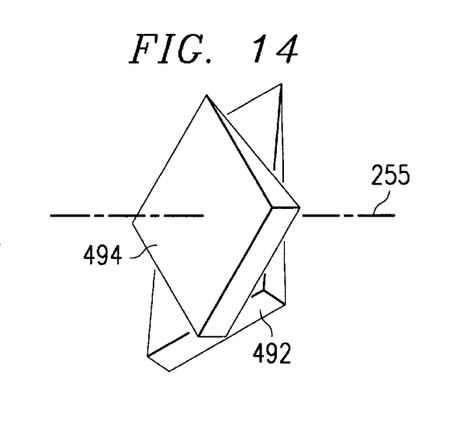
FIG. 14 is a perspective view of a pair of prisms of the alignment element of FIG. 13.

As shown best by FIG. 14, the first prism 492 and the second prism 494 may be of the same power. In this embodiment, the first and second prisms 492 and 494 may have a combined power of zero when rotated opposite one another and a power of twice that of either one when rotated parallel with one another. Rotation of one prism relative to the other will deviate the image along a straight line at the reticle 300. Rotation of the prisms together will rotate the image at the reticle 300. Accordingly, the image of the day channel 56 may be deviated to any point on the reticle by rotating the prisms 492 and 494 in concert, individually, or in some combination.

The power of the prisms 492 and 494 may be varied depending on the design and configuration of the sight 20. Prisms 492 and 494 of a greater power will allow greater deflection of the image beam at the reticle 300. Prisms 492 and 494 of a lesser power will allow greater accuracy in deflecting the image beam at the reticle 300.

Figure 15:
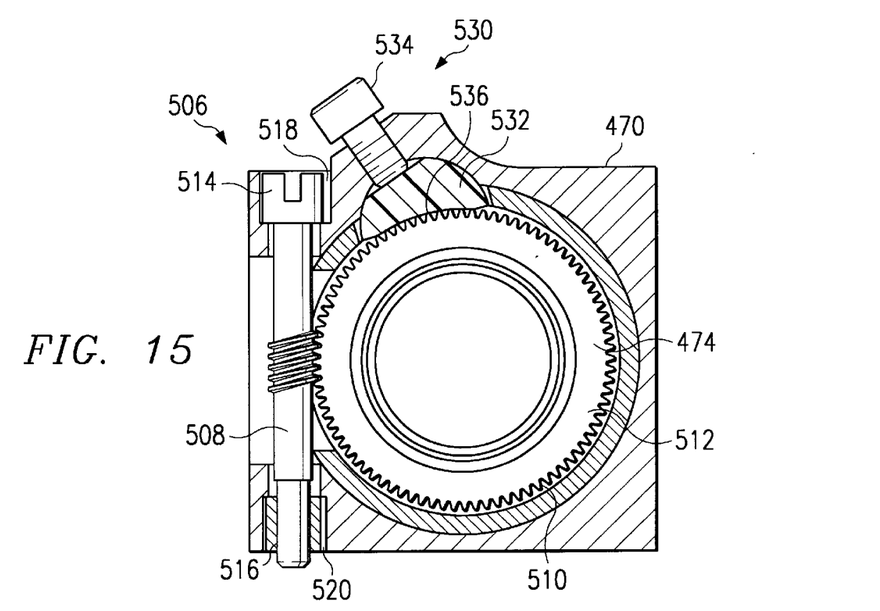
FIG. 15 is a cross sectional view of the alignment element of FIG. 13.

As shown best by FIG. 15, an adjustment device 506 for rotating the first annular frame 474 may comprise a threaded screw 508 for engaging a plurality of teeth 510 formed on a periphery 512 of the first annular frame 474. The threaded screw 508 may include an enlarged head 514 at a top end and an fixed nut 516 at an opposed end. The threaded screw 508 may be positioned in operative relation with the teeth 510 of the first annular frame 474 by recesses 518 and 520 formed in the housing 470. Accordingly, rotation of the threaded screw 508 may rotate the first annular frame 474, and thus the first prism 492.

A clamping assembly 530 may be provided for fixably securing the first annular frame 474 after the image has been aligned at the reticle 300. In one embodiment, the clamping assembly 530 may comprise a brace 532 and a screw 534. The brace 532 may include a surface 536 adapted to engage the periphery 512 of the first annular frame 474. For the embodiment of FIG. 15, the surface 536 may have a concave shape adapted to fit substantially flush against the teeth 510 of the periphery 512.

The screw 534 may engage a threaded section of the frame 470 and contact the brace 532 opposite the surface 536. The screw 534 may be adjustable in the direction of the first annular frame 474 to secure the brace 532 against the first annular frame 474.

Although not shown by FIG. 15, it will be understood that the second annular frame 476 may include an adjustment device for rotating the second annular frame 476 as described above in connection with the first annular frame 474. Additionally, a clamping assembly may be provided for securing the second annular frame 476 as described above in connection with the first annular frame 474.

In accordance with one aspect of the present invention, the sight 20 may be mounted to the weapon 22 with non-integral members. The non-integral members allow the sight 20 to be designed independently of the weapon 22. Accordingly, the sight 20 may be of a modular design that can be mounted to a weapon 22 with non-integral members configured for that weapon.

Figure 16:
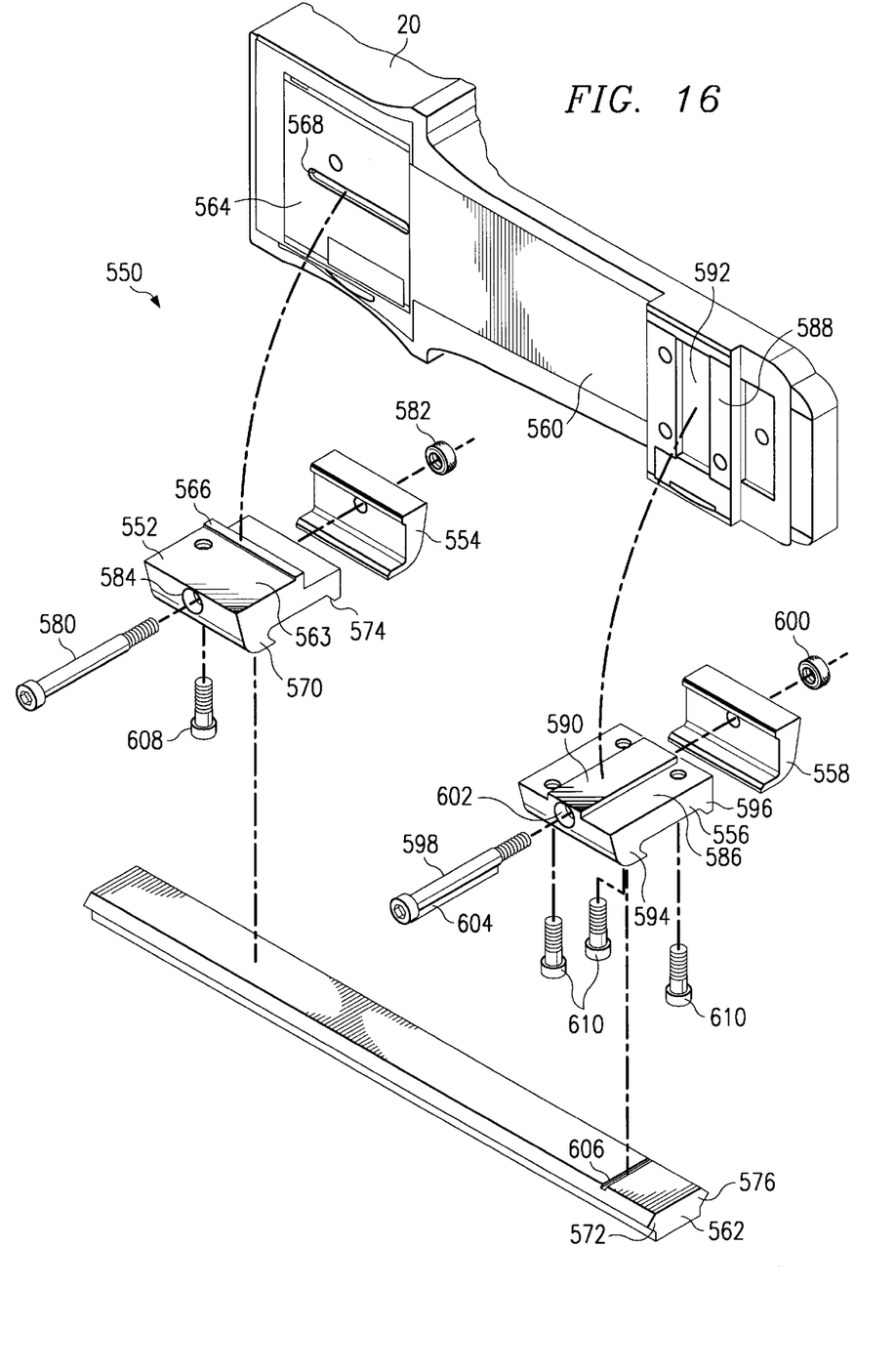
FIG. 16 is an exploded view of a mounting assembly of the sight of FIG. 1.

FIG. 16 illustrates one embodiment of a mounting assembly 550 for mounting the sight 20 to the weapon 22. As shown by FIG. 16, the mounting assembly 550 may comprise a first foot 552 operatively associated with a first clamp 554 and a second foot 556 operatively associated with a second clamp 558. As described in more detail below, the feet 552 and 556 may be permanently secured to a bottom 560 of the sight 20 and may engage a rail 562 of the weapon 22 with the aid of the clamps 554 and 558. It will be understood that the clamps may be reversed within the scope of the invention.

The first foot 552 may include a top 563 adapted to engage a first mounting section 564 of the bottom 560 of the sight 20. A tab 566 may extend across the top 563 of the first foot 552 in a direction substantially parallel to the rail 562. A recess 568 may be formed in the first mounting section 564 to receive the tab 566.

A side 570 of the first foot 552 may be adapted to engage a first edge 572 of the rail 562. An opposite side 574 of the first foot 552 may be adapted to engage a second edge 576 of the rail 562 in combination with the first clamp 554. The first clamp 554 may be coupled to the opposite side 574 of the first foot 552 by a locking screw 580 and a nut 582. The locking screw 580 may be press fit into an aperture 584 formed in the side 570 the first foot 552 and extend from the opposite side 574 of the first foot 552. The projecting portion of the locking screw 580 may be threaded to receive the nut 582.

The second foot 556 may include a top 586 adapted to engage a second mounting section 588 of the bottom 560 of the sight 20. A tab 590 may extend across the top 586 of the second foot 556 in a direction substantially normal to the rail 562. A recess 592 may be formed in the second mounting section 588 to receive the tab 590.

A side 594 of the second foot 556 may be adapted to engage the first edge 572 of the rail 562. An opposite side 596 of the second foot 556 may be adapted to engage the second edge 576 of the rail 562 in combination with the second clamp 558. The second clamp 558 may be coupled to the opposite side 596 of the second foot 556 by a locking screw 598 and a nut 600. The locking screw 598 may be press fit into an aperture 602 formed in the side 594 the second foot 556 and extend from the opposite side 596 of the second foot 556. The projecting portion of the locking screw 598 may be threaded to receive the nut 600.

The locking screw 598 may include a brace 604 for engagement with a recoil groove 606 of the rail 562. The brace 604 may prevent the sight 20 from sliding along the rail 562 in response to the recoil of the weapon 22. In one embodiment, the brace 604 may be formed from a portion of the locking screw 598.

The rail 562 may be a Weaver rail as shown by FIG. 16. It will be understood that feet 552 and 556 and the clamps 554 and 558 may be configured to engage other types of rails 562 in accordance with the invention.

The first foot 552 may be initially coupled to the first mounting section 564 of the sight by a screw 608. Similarly, the second foot 556 may be initially coupled to the second mounting section 588 of the sight 20 by screws 610. It will be understood that pins and coupling devices may be used in the place of the screws 608 and 610.

Preferably, the screws 608 and 610 are slightly loose when the feet 552 and 556 are initially coupled to the sight 20. This allows the sight 20 to move slightly when engaged to the rail 562. The engagement of the tab 566 with the recess 568 allows the forward portion of the sight 20 to move parallel to the rail 562. The engagement of the tab 590 with the recess 592 allows the rearward portion of the sight 20 to move normal to the rail 562. This movement prevents the sight 20 from twisting or binding when the feet and clamps are secured to the rail 562, which may cause the night and day channels 54 and 56 to become unaligned.

After the feet and clamps feet are secured to the rail 562, the feet may be permanently secured to the bottom 560 of the sight 20. In one embodiment, the feet may be permanently secured with an adhesive and by tightening the screws 608 and 610. It will be understood that the feet may be otherwise permanently secured to the sight 20.

The optical bench, housings, and frames of the sight 20 may be made of aluminum. Aluminum may be preferred because it is lightweight and relatively inexpensive. Additionally, aluminum is easy to machine and finish. It will be understood that the optical bench, housings, and frames may be made from other types of materials that are strong and lightweight.

The lenses, windows, prisms and other optical components of the sight 20 may be made of BK7 glass which is relatively inexpensive and well known in the art. It will be understood that the optical components may be made from other types of glass or polymers operable to transmit the image of the scene. Preferably, the individual components include an anti-reflection coating to prevent reflections from interfering with the image displayed on the reticle assembly 58.

Although the present invention has been described with several embodiments, various changes and modifications may be suggested to one skilled in the art. It is intended that the present invention encompass such changes and modifications as fall within the scope of the appended claims.

What is claimed is:

1. An optical clamping system, comprising:

a housing having a substantially convex periphery;

an optical surface disposed within the housing, the optical surface operable to transmit an image of a scene along an optical channel;

a clamp having a substantially concave surface for engagement with a complementary convex section of the periphery of the housing; and the clamp operable to exert force on the periphery of the housing in a direction substantially normal to the optical channel to secure the housing between the clamp and an opposing substantially concave stop, the opposing stop being a nonadjustable section of an optical bench substantially opposite the clamp.

2. The optical clamping system of claim 1, wherein the periphery of the housing is substantially circular.

3. The optical clamping system of claim 1, the clamp further comprising:

a brace including the substantially concave surface;

a screw connected to the brace opposite the substantially concave surface; and the screw adjustable in the direction substantially normal to the optical channel to secure the housing between the brace and the opposing stop.

4. The system of claim 1, further comprising a plurality of optical surfaces disposed within the housing and spaced apart from each other.

5. The system of claim 1, wherein the substantially concave surface of the clamp engages at least a 40 degree section of the periphery of the housing.

* * * * *